United States Patent [19]

Lin

[11] Patent Number: 5,997,623

[45] Date of Patent: Dec. 7, 1999

[54] INK JET INKS COMPRISING ANTI-CURL AGENTS AND PRINTING PROCESSES

[75] Inventor: John Wei-Ping Lin, Webster, N.Y.

[73] Assignee: Xerox Corporation, Stamford, Conn.

[21] Appl. No.: 08/876,417

[22] Filed: Jun. 16, 1997

[51] Int. Cl.⁶ ................................................. C09D 11/00
[52] U.S. Cl. ..................................... 106/31.58; 106/31.86
[58] Field of Search .......................................... 106/31.58

[56] References Cited

U.S. PATENT DOCUMENTS

| | | | |
|---|---|---|---|
| 4,251,824 | 2/1981 | Hara et al. | 346/140 R |
| 4,327,174 | 4/1982 | von Meer | 430/530 |
| 4,410,899 | 10/1983 | Haruta et al. | 346/140 R |
| 4,412,224 | 10/1983 | Sugitani | 346/1.1 |
| 4,532,530 | 7/1985 | Hawkins | 346/140 R |
| 4,601,777 | 7/1986 | Hawkins et al. | 156/626 |
| 4,627,875 | 12/1986 | Kobayashi et al. | 106/22 |
| 4,840,674 | 6/1989 | Schwarz | 106/22 |
| 5,085,698 | 2/1992 | Ma et al. | 106/20 |
| 5,169,437 | 12/1992 | You | 106/20 D |
| 5,180,425 | 1/1993 | Matrick et al. | 106/22 R |
| 5,205,861 | 4/1993 | Matrick | 106/20 D |
| 5,207,824 | 5/1993 | Moffatt et al. | 106/22 R |
| 5,207,825 | 5/1993 | Schwarz, Jr. | 106/22 R |
| 5,220,346 | 6/1993 | Carreira et al. | 346/1.1 |
| 5,223,026 | 6/1993 | Schwarz, Jr. | 106/20 D |
| 5,281,261 | 1/1994 | Lin | 106/20 R |
| 5,356,464 | 10/1994 | Hickman et al. | 106/22 R |
| 5,371,531 | 12/1994 | Rezanka et al. | 347/43 |
| 5,389,133 | 2/1995 | Gundlach et al. | 106/22 H |
| 5,540,764 | 7/1996 | Haruta et al. . | |
| 5,549,740 | 8/1996 | Takahashi et al. . | |
| 5,709,737 | 1/1998 | Malhotra et al. | 106/31.58 |

OTHER PUBLICATIONS

"Ethylene Oxide Chatper," *Ullmann's Encyclopedia of Industrial Chemistry*, 3$^{rd}$ Edition, vol. A10, John Wiley & Sons (1987).

*Primary Examiner*—Mark L. Bell
*Assistant Examiner*—Veronica Faison
*Attorney, Agent, or Firm*—Oliff & Berridge, PLC

[57] ABSTRACT

An aqueous ink jet ink comprises water, a colorant selected from a dye or a pigment, and a diol derivative according to the following formula (Formula I):

$$HO-(CHX-CHYO)_j-(CH_2)_a-G-(CH_2)_b-(OCHW-CHZ)_k-OH \quad (I)$$

wherein G is independently selected from the group consisting of $SO_2$, SO, and CO; X, Y, W, and Z are independently selected from the group consisting of H, $CH_3$ and $C_nH_{2n+1}$ where n equals 2 to about 20; j and k independently equal from 0 to about 100; and a and b independently equal from 1 to about 20. In addition, a multi-color ink jet printing process comprises (1) printing at least one of aqueous ink jet inks comprising the above diol derivative onto a print substrate at any desired sequence by a printhead in a single or multiple pass method according to digital data signals and (2) optionally applying heat to the print substrate and the imaged inks at any stage of said ink jet printing process including before, during, and after printing as well as combinations thereof.

25 Claims, No Drawings

INK JET INKS COMPRISING ANTI-CURL AGENTS AND PRINTING PROCESSES

FIELD OF THE INVENTION

The present invention is directed to aqueous ink compositions. More specifically, the present invention is directed to aqueous ink compositions particularly suitable for use in high speed and high resolution ink jet printing processes. The ink jet inks of the present invention generally include novel diol derivatives that function as humectants and anti-curl agents.

BACKGROUND OF THE INVENTION

Ink jet printing is a non-impact printing method that produces droplets of ink that are deposited on a print substrate such as paper or transparent film in response to an electronic digital data signal. Thermal or bubble jet drop-on-demand ink jet printers have found broad applications as output for personal computers in the office and in the home.

In existing thermal ink jet printing processes, the printhead typically comprises one or more ink jet ejectors, as disclosed in U.S. Pat. Nos. 4,601,777, 4,532,530, 4,412,224, 4,410,899, and 4,251,824. Each ejector includes a channel communicating with an ink supply chamber, or manifold, at one end and an opening at the opposite end, referred to as a nozzle. A thermal energy generator, usually a resistor, is located in each of the channels at a predetermined distance from the nozzles. The resistors are individually addressed with a current pulse to momentarily vaporize the ink within the respective channel to form a bubble that expels an ink droplet. As the bubble grows, the ink rapidly bulges from the nozzle and is momentarily contained by the surface tension of the ink as a meniscus. This is a very temporary phenomenon, and the ink is quickly propelled toward a print substrate. As the bubble begins to collapse, the ink still in the channel between the nozzle and bubble starts to move towards the collapsing bubble, causing a volumetric contraction of the ink at the nozzle and resulting in the separation from the nozzle of the bulging ink as a droplet. The acceleration of the ink out of the nozzle while the bubble is growing provides the momentum and velocity for propelling the droplet in a substantially straight line direction towards a print substrate, such as a piece of paper. Important properties of the ink in this context include the ink's viscosity and surface tension. Because the droplet of ink is emitted only when the resistor is actuated, this type of thermal ink jet printing is known as "drop-on-demand" printing.

Another type of drop-on-demand ink jet printing is called piezoelectric ink jet printing. This ink jet printing system has an ink filled channel with a nozzle on one end and a regulated piezoelectric transducer near the other end to produce pressure pulses according to the digital data signal.

A third type of drop-on-demand ink jet printing is called acoustic ink jet printing which can be operated at high frequency and high resolution. The ink jet printing system utilizes a focused acoustic beam formed with a spherical lens illuminated by a plane wave of sound created by a piezoelectric transducer. The focused beam reflected from a surface exerts a pressure on the surface of the liquid ink, resulting in ejection of small droplets of ink onto an imaging substrate. Aqueous ink jet inks can be used in this printing system.

An ink jet printing method that is different from the drop-on-demand ink jet printing is called a continuous ink jet printing. In this ink jet printing system, ink is emitted from a nozzle in a continuous stream under pressure. The stream is ejected out of orifice and perturbed, causing it to break up into droplets at a fixed distance from the orifice. At the break up point, the electrically charged ink droplets are passed through an applied electrode which is controlled and switched on and off according to the digital data signals. The charged ink droplets are passed through a controllable electric field which adjusts the trajectory of each ink droplet in order to direct it to either a gutter for ink deletion and recirculation or a specific location on a print substrate to create image. Multiple orifices or nozzles can be used to increase imaging speed and throughput.

In a drop-on-demand ink jet printing apparatus, the printhead typically comprises a linear array of ejectors, and the printhead is moved relative to the surface of the print substrate, either by moving the print substrate relative to a stationary printhead, or vice-versa, or both. In some types of apparatus, a relatively small printhead moves across a print substrate numerous times in swaths (i.e., multiple passes) to print a desired image. In this case, a desired image including a color image is completely produced on a print substrate in several swaths before the substrate is advanced. This type of printing is called multi-pass or checkerboard ink jet printing process. In checkerboard ink jet printing (or multiple pass method), the printhead passes over the print substrate and provides ink at a desired locations (e.g., printing only even or odd numbered dots in a swath). On one or more subsequent passes the remaining dots in the image are printed before the print substrate is advanced. This type of multi-color ink jet printing is commonly found in a desk-top ink jet printer including a thermal ink jet printer. It produces good color images on plain paper, but at a slower printing speed.

Alternatively, a stationary ink jet printhead that consists of an array of ejectors and extends the full width of a print substrate may pass ink down the print substrate to give full-page images, in what is known as a "full-width array" ink jet printer. When the printhead and the print substrate are moved relative to each other, image-wise digital data is used to selectively activate the thermal energy generators (e.g., resistors) in the printhead over time so that the desired image can be created on the print substrate quickly in a single pass mode. The full-width-array printhead is generally preferred to be in a stationary position while the print substrate is continuously moving to receive ink image as it passes through the printhead. However, the full-width array printhead can also be moved across the print substrate if it is desired. In a multi-color ink jet printing process, several "full-width array printheads" including cyan, magenta, yellow, and black printheads and their corresponding ink jet inks are used to provide different color images on the print substrate. Fast ink jet printing can be achieved by using the full-width array printheads.

With the demand for higher resolution printers, the nozzles of a printhead or full-width array printhead in ink jet printers are correspondingly decreasing in size. Nozzle openings of a printhead are typically about 50 to 80 micrometers (or microns) in width or diameter for 300 spots per inch (spi) resolution printers. With the advent of higher resolution (e.g., 400 spi and 600 spi) printers, these nozzle openings are smaller and are typically about 10 to about 49 micrometers (microns) in width or diameter. These printheads and full-width array printheads with small nozzle dimensions require special inks that do not easily clog the small nozzle openings.

A major concern with all ink jet printers, and high resolution ink jet printers in particular, is clogging of nozzles during operation and between operations. This is caused by evaporation of an organic solvent or water from the opening of the nozzle. In dye-based inks, this can cause crystallization or precipitation of soluble components such as dye or solid additives as well as viscosity increase of ink fluid. In pigment-based inks, this evaporation can cause precipitation of the pigment particles due to flocculation or aggregation, or precipitation of solid additives as well as viscosity increase of the ink fluid. Initial evaporation of water and solvent generally causes an increase in ink viscosity, which affects the ability of the heater (i.e., a resistor) of a printhead to fire a drop of ink properly through a nozzle.

The inception of clogging may cause distortion of the image or alphanumeric characters being printed by the printhead. This may appear as a drop of ink that is displaced from its intended position. Sometimes two drops of ink will be formed equally spaced from the intended target position. Sometimes small numerous satellite drops are produced. On some occasions the drop may even reach its intended position but at a lower drop volume or drop mass producing a lower optical density image. Ultimately, the clogged nozzle may fail to fire entirely, and no image can be generated on a print substrate.

Ink jet printers are designed to prevent excessive evaporation of solvent from printhead nozzles by sealing the printhead or printbar (comprising many butted printheads such as a partial width printhead and a full-width array printhead) in an air-tight chamber when not in use. These devices can become ineffective with continued printer use because dried ink deposits can be formed at the front face of a printhead due to ink flooding or at the rubber seals of the air-tight chamber, causing the system to lose its air-tight condition. Another device used to prevent clogging of the printhead nozzle is a wiper that removes solid formed near or at the opening of a nozzle. This device in some cases may become ineffective because of the depth of the plug or because of sufficient hardness of the plug, which thereby resists mechanical removal. Another clogging remedy is the use of vacuum suction to clear the nozzle of any deposits. These devices are effective only for soft ink clogging. They are usually inefficient to remove hard ink deposits, and add considerable expense to the costs of the printer.

Another commonly used mechanism to cure clogging is to clear the nozzle by firing the printhead in a non-image mode, e.g. into a collection receptacle. While this solution is an effective remedy, it requires that the ink forms a soft or non-cohesive plug. To make this non-image clearance process effective, the ink in the nozzle must be mechanically or cohesively weak for easy jetting or ink removal. Frequent firing of an ink jet nozzle for maintenance purposes may be needed in order to avoid the formation of hard solid plug.

Therefore, a critical requirement for an ink jet ink is the ability of the ink to remain in a fluid and jettable condition in a printhead opening that is exposed to air. The maximum idling time that still allows a printhead to function properly with a transit time $\leq 100$ microseconds for an ink to travel a distance of 0.5 mm after a period of non-use or idling is called the latency or decapped time. This test is run with the printhead or nozzles uncovered or decapped and generally at a relative humidity of 15%. The time interval is the longest length of time that the printhead, uncovered, will still fire a specified drop without a failure. The longer the latency time rating, the more desirable is the ink for use in an ink jet printer. U.S. Pat. No. 4,840,674 to Schwarz, the entire disclosure of which is incorporated herein by reference, describes an ink jet ink having sulfone derivatives in combination with dyes and other ink additives. However, these sulfone derivatives were not used in pigment inks and they were not disclosed to have desirable anti-curl properties which are desired for ink jet printing with archival capability. Thus, there is a need to improve ink latency (particularly for high resolution printheads) and anti-curl property by using a novel water soluble or miscible humectant or co-solvent in inks.

Another important requirement for ink jet inks, especially for pigment-based inks, is for the pigment particles to remain stable and uniformly dispersed in the ink throughout the life of the ink jet cartridge. Dye-based ink jet inks suffer from deficiencies in waterfastness (water resistance) and lightfastness (light resistance) after being printed on various substrates. Pigments provide an image, on a wide variety of substrates, having high optical density and sharp edges with very good waterfastness and lightfastness. Therefore, pigments are a preferred alternative to dyes in an ink jet ink, provided that the pigment particles and dispersions can be made stable to prevent undesired flocculation and/or aggregation and settling. U.S. Pat. No. 5,281,261 to Lin, and pending U.S. patent application Ser. No. 08/810,841 to Lin et. al., the entire disclosures of which are incorporated herein by reference, describe an ink jet ink having pigment particles in inks and in combination with dyes and other ink additives.

Great effort has been made in attempts to provide both dye-based and pigment-based ink jet inks with acceptable latency and stability for high speed and high resolution ink jet printing. However, there continues to have a demand for inks having many above-mentioned desirable characteristics.

Moreover, certain ink jet printers require ink jet inks to have sufficient optical density in a single pass method, i.e. without applying additional ink to the substrate or paper. Additionally, certain ink jet printheads in printers are designed to provide enhanced resolution such as, for example, a color ink jet printer capable of providing genuine 600 spi (printhead resolution) color ink jet printing as compared to the currently used 360 spi and 300 spi printers in the state-of-the-art commercial products. These devices (printheads or full-width array printheads or printbars) require specially refined inks that do not easily cause clogging or plugging of the ink jet nozzles that, as mentioned above, are significantly narrower than those of 360 spi and 300 spi printers. Many current state-of-the-art color printhead nozzles for commercial color thermal ink jet printers are limited to a resolution of equal to or less than 360 spi.

Many state-of-the-art commercial ink jet inks, including dye-based inks and pigment-based inks, show a short latency (about 10 sec.) when they are used in conjunction with a high resolution (>360 spi, for example 600 spi) printhead with a channel width or nozzle diameter of about 10 to 49 microns. Accordingly, such inks are not suitable for high resolution color ink jet printers because they have undesired jetting characteristics and large unstable pigment particles (>3 microns with agglomeration or flocculation) that can easily cause clogging of printhead nozzles. Thus, there is a need to provide dye-based and pigment-based inks that have good latency, especially when they are used in the aforementioned high resolution printheads.

There is also a need in the art for developing new aqueous ink compositions comprising a colorant of a dye or pigment and other ink additives that can be utilized in high resolution ink jet printers. There is also a need for inks that provide high optical density not only for printing in a single application or pass (for high speed printing) method but also in multiple passes (multi-pass) method. Furthermore, there is a need to provide inks that are capable of printing at high speed. This requires a high jetting frequency response (e.g., greater than 3.0 KHz, and preferably greater than 7.0 KHz).

Aqueous inks used in ink jet printing generally have water as a major component. Water has the advantage of being non-toxic, non-combustible and environmentally sound relative to non-aqueous inks, which are largely composed of organic solvents. Water is also an excellent medium for dispersing pigments or dissolving dyes.

The use of water in large concentrations, however, also has several disadvantages, as disclosed in U.S. Pat. No. 5,356,464 to Hickman et al. Water has a fast evaporation rate relative to high-boiling organic solvents, which reduces the ink latency. Water also interacts with paper to cause two major distortions known as paper cockle and paper curl. Paper cockle is a distortion in which bumps, indentations and other irregularities are randomly produced on the printed paper, giving the paper a "wrinkled" or "wavy" appearance. Paper cockle can cause the paper in the deformed area to rub against the printhead in the printing process. Paper curl (or curl) is a phenomenon in which the edges of the paper migrate towards the center of the paper after the printing and aging. In extreme cases, curl causes the paper to assume the shape of a scroll upon aging. The curl direction may be on the printed side of the paper, or it may be on the non-printed side (the latter being known as "reverse curl"). U.S. Pat. No. 5,356,464 discloses aqueous ink compositions including anti-curl agents such as 1,3-diols, 1,3,5-triols, amino-1,3-diols and their polyoxyalkylene derivatives. Some of those materials have high viscosity at room temperature and cause poor jetting performance or jetting failure at a concentration in ink that is required to effectively reduce paper curl. Thus, there is a need for the development of anti-curl agents which give low ink viscosity to avoid poor jetting performance.

The use of heating elements (commonly employed to increase the rate of drying of aqueous inks) may be insufficient to reduce paper curl. Various mechanical devices to reduce curl such as heated rollers and tension applicators have been tried. These devices are only marginally effective and add considerably to the cost and size of the printer. Heated rollers used to reduce curl differ from the heaters used to increase drying rate, such as microwave heating, radiant heating, heated plate, heated drum, forced hot air heating, convection heating, and the like. In heaters to reduce curl, heat is typically applied to both sides of the paper after printing and can potentially cause ink smearing; in heaters to increase the drying rate, heat may be applied at any desired stage of printing including before, during, and after the printing process. Microwave dryers, for example, are set forth in U.S. Pat. Nos. 5,220,346 to Carreira et al. and 4,327,174 to Von Meer, the disclosures of which are incorporated herein by reference. The inks employed in ink jet printers having a microwave dryer comprise salts including mono-valent and multi-valent metal salts that improve the rate of drying. Such additives, however, do not reduce paper curl.

To reduce cockle and curl in ink jet printers, efforts have been made to provide anti-curl and anti-cockle agents to reduce this problem. For example, U.S. Pat. No. 5,356,464 to Hickman et al. and U.S. Pat. No. 5,169,437 to You, the entire disclosures of which are incorporated herein by reference, describe anti-curl agents that may be utilized in ink jet inks. U.S. Pat. No. 5,207,824 to Moffatt et al. describes an ink jet ink comprising an anti-cockle agent for thermal ink jet printers. As mentioned above, some of the anti-cockle and anti-curl agents, especially the triols, are very viscous and can significantly increase ink viscosity, thereby causing poor jetting performance and jetting failure especially in a high resolution printhead with narrow nozzles.

Thus, there is a need for aqueous ink compositions that can reduce paper curl, thus eliminating the need for using expensive, ineffective and cumbersome mechanical devices or special print media. There is also a need to have an ink component that can be used in conjunction with known anti-cockle and anti-curl agents to reduce ink viscosity and to provide good jetting property. In addition, there is also a need for aqueous ink compositions that have low viscosity and can be used either with or without heaters in the printing process to increase ink penetration rate and image drying.

Another common problem encountered in employing aqueous ink jet ink compositions is kogation. Occasionally, as ink in an ink jet printhead is heated and vaporized, some ink component will undergo thermal breakdown. This decomposition leads to residue deposition on the resistor's surface in a process known in the art as "kogation." Such deposits prevents effective heat transfer from the heater to the ink on the heater (resistor) surface, thereby causing reduced bubble formation, decreased ejection velocity of the ink drops, and reduced ink drop volume delivered to the print substrate. Consequently, print quality is reduced and failure in bubble formation may result in failure of the ink jet printer to print. Thus, desirable humectants used in ink jet ink compositions must have the capability of not only reducing the rate of ink evaporation to avoid crusting and clogging of a printhead but also preventing the formation of undesired kogation.

Many known humectants employed in ink jet inks are diol derivatives such as ethylene glycol, propylene glycol, and the like. However, these diols do not have good anti-curl properties. An effective humectant and anti-curl agent should have a good water solubility and low vapor pressure. There is a need to have an ink component which can serve as humectant and anti-curl agent. Furthermore, there is also a need to have a novel humectant that can be used in conjunction with other known anti-curl agents in inks to reduce ink evaporation rate for long latency and to lower ink viscosity for achieving good jetting performance.

SUMMARY OF THE INVENTION

Ink compositions of the present invention fill the above needs and can be employed in both dye and pigment based inks to reduce the rate of ink evaporation, clogging of ink ingredients, paper curl, ink viscosity, and kogation. Further, the ink compositions of the present invention have improved latency, jetting efficiency, drop velocity, frequency response, print speed and print quality. The ink jet ink compositions of the present invention fulfill the above needs without any deleterious effects such as inducing undesired clogging of the printhead nozzles or generating inferior print quality. The present invention relates to an aqueous ink jet ink comprising a special diol derivative that acts as a humectant to improve ink stability and jetting performance. In addition, the humectants of the present invention are believed to have the ability to strongly interact with hydroxyl functional group of cellulose in the print substrate to provide good anti-curl properties.

The present invention further relates to black or color ink jet inks (e.g. cyan, magenta, and yellow inks) for high quality, high speed, and high resolution (e.g. 600 spi printhead resolution) printing with single, partial-width, or full-width array printheads. The present invention relates to ink jet inks that enhance the reliability and lifetime of an ink jet ink printhead and also reduces the cost of required replacement of an expensive printhead due to kogation, heater deposit, and deterioration of ink jet ink performance. The ink jet inks of the present invention can dry very fast to avoid inter-color bleeding on plain papers with or without a heating device. The ink jet inks of the present invention comprising a special diol derivative also have reduced curl property when they are printed in a solid area on plain papers. In addition, the ink jet inks are capable of jetting at high speed with full-width array printheads (full-width printbars) to give black and multi-color images at a speed of at least 5 pages per minute.

DETAILED DESCRIPTION OF THE INVENTION

The present invention relates to an aqueous ink jet ink composition comprising water, at least a colorant of dye or pigment, and at least a diol derivative represented by the following general formula (Formula (I)):

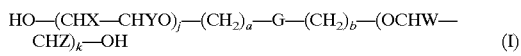
(I)

wherein G is independently selected from the group consisting of $SO_2$ (sulfonyl or sulfone group), SO (sulfoxide group), and CO (carbonyl or ketone group); X, Y, W, and Z are independently selected from the group consisting of H, $CH_3$, and $C_nH_{2n+1}$ where n equals 2 to about 20; j and k independently equal from 0 to about 100; and a and b independently equal from 1 to about 20.

When G in the Formula (I) is $SO_2$, the diol derivatives are dihydroxysulfone derivatives (or hydroxysulfone derivatives comprising two hydroxyl groups). Examples of dihydroxysulfone derivatives according to the present invention include, but are not limited to, 2-hydroxyethyl,3'-hydroxypropyl sulfone, 2,2'-sulfonyldiethanol (bis(2-hydroxyethyl)sulfone), 3,3'-sulfonyldipropanol(bis(3-hydroxypropyl) sulfone), 3-hydroxypropyl,4'-hydroxybutyl sulfone, 4,4'-sulfonyldibutanol(bis(4-hydroxybutyl) sulfone), and the like, their reaction products with alkyleneoxides including ethyleneoxide and propyleneoxide, as well as mixtures thereof. The reaction of hydroxyl group(s) of a diol derivative with alkyleneoxides such as ethyleneoxide and propyleneoxide gives a new diol derivative which is useful for ink jet inks.

The aforementioned dihydroxysulfone derivatives comprise two hydroxyl groups and one sulfone ($>SO_2$, sulfurdioxide group) group. There are also other useful hydroxysulfone derivatives (including dihydroxy-, trihydroxy-, and tetrahydroxy-sulfone derivatives) which comprise at least two hydroxyl groups and one sulfone ($>SO_2$) group but are not included in the Formula (I). Those useful hydroxysulfone derivatives (e.g. cyclic and aromatic dihydroxysulfone derivatives) of the present invention include, but are not limited to, 4,4'-sulfonyldiphenol, 4,4'-sulfonyl-di (2,6-dimethylphenol), cis and trans 3,4-dihydroxysulfolanes, cis and trans 3,5-dihydroxypentamethylenesulfurdioxides, their isomers, their reaction products with alkyleneoxides including ethyleneoxide and propyleneoxide, as well as mixtures thereof.

When G in Formula (I) is SO, the diol derivatives of the present invention are dihydroxysulfoxide derivatives (or hydroxysulfoxide derivatives comprising two hydroxyl groups). Examples of dihydroxysulfoxide derivatives according to the present invention include, but are not limited to, 2-hydroxyethyl, 3'-hydroxypropyl sulfoxide, 2,2'-sulfoxydiethanol(bis(2-hydroxyethyl) sulfoxide), 3,3'-sulfoxydipropanol(bis(3-hydroxypropyl) sulfoxide), 3-hydroxypropyl, 4'-hydroxybutyl sulfoxide, 4,4'-sulfoxydibutanol(bis(4-hydroxybutyl)sulfoxide, and the like, their reaction products with alkyleneoxides including ethyleneoxide and propyleneoxide, as well as mixtures thereof.

The aforementioned dihydroxysulfoxide derivatives comprise two hydroxyl groups and one sulfoxide (>SO) group. There are also other useful hydroxysulfoxide derivatives (including dihydroxy-, trihydroxy-, and tetrahydroxy-sulfoxide derivatives) which comprise at least two hydroxyl groups and one sulfoxide (>SO) group but are not included in the Formula (I). Those useful hydroxysulfoxide derivatives (e.g. cyclic and aromatic dihydroxysulfoxide derivatives) of the present invention include, but are not limited to, 4,4'-sulfoxydiphenol, 4,4'-sulfoxy-di(2,6-dimethylphenol), cis and trans 3,4-dihydroxy-tetramethylenesulfoxides, cis and trans 3,5-dihydroxy-pentamethylenesulfoxides, their isomers, their reaction products with alkyleneoxides including ethyleneoxide and propyleneoxide, as well as mixtures thereof.

When G in Formula (I) is CO, the diol derivative are dihydroxyketone derivatives (or hydroxyketone derivatives comprising two hydroxyl groups). Examples of dihydroxyketone derivatives according to the present invention include, but are not limited to, 2-hydroxyethyl,3'-hydroxypropyl ketone, 2,2'-carbonyldiethanol(bis(2-hydroxyethyl) ketone), 3,3'-carbonyldipropanol(bis(3-hydroxypropyl) ketone), 3-hydroxypropyl, 4'-hydroxybutyl ketone, 4,4'-carbonyldibutanol (bis(4-hydroxybutyl) ketone), and the like, their isomers, their reaction products with alkyleneoxides including ethyleneoxide and propyleneoxide, as well as mixtures thereof.

The aforementioned dihydroxyketone derivatives of the present invention comprise two hydroxyl groups and one carbonyl ($>C=O$) group. There are also other useful hydroxyketone derivatives (including dihydroxy-, trihydroxy-, and tetrahydroxy-ketone derivatives) which comprise at least two hydroxyl groups and one carbonyl group ($>C=O$) but are not included in the Formula (I). Those useful hydroxyketone derivatives (e.g. cyclic and aromatic dihydroxyketone derivatives) of the present invention include, but are not limited to, 4,4'-carbonyldiphenol, 4,4'-carbonyl-di(2,6-dimethylphenol), cis and trans 3,4-dihydroxy-cyclopetanone, cis and trans 3,5-dihydroxy-cyclohexanone, their isomers, their reaction products with alkyleneoxides including ethyleneoxide and propyleneoxide, as well as mixtures thereof.

Some of the aforementioned diol derivatives of the present invention have lower viscosity at room temperature than many commonly known diol humectants including diethyleneglycol, di-propyleneglycol, polyethyleneglycol, and polypropyleneglycol at the same concentration level. Those diol derivatives of the present invention can be used as a viscosity modifier in many ink jet inks to provide inks with low viscosity for good jetting performance, long latency, and fast printing speed.

The hydroxyl group(s) of the aforementioned diol derivatives according to the present invention can react with alkyleneoxide derivatives including ethyleneoxide and propyleneoxide either with or without a catalyst (e.g., a basic or acid catalyst) to form new diol derivatives which comprise moieties such as ethyleneoxide, propyleneoxide, and their mixtures with a wide range of molecular weights. The reaction of alkyleneoxide derivatives and hydroxyl compounds are well known. For example, one reference is the Ethylene Oxide Chapter in *Ullmann's Encyclopedia of Industrial Chemistry, Third Edition,* Vol. A 10, published by John Wiley & Sons (1987), the entire disclosure of which is incorporated herein by reference.

The aforementioned diol derivatives and their reaction products with alkyleneoxides in the ink jet inks of the present invention can form strong hydrogen bonding with the hydroxyl groups of the cellulose in the print substrate to provide good anti-curl properties. They can be used in aqueous ink jet inks in an amount from about 0.1% to about 40% by weight, preferably from about 1.0% to about 35.0% by weight, more preferably from about 3.0% to about 30.0% by weight. However, it can be outside of this range.

In addition to the above-identified diol derivatives, which can act as humectants in ink jet inks of the present invention, the inks may further comprise other additional humectants and/or co-solvents. When present, additional humectants and/or co-solvents may include any of the various known humectants and co-solvents of ink jet inks including, but not limited to, glycol derivatives, such as ethylene glycol, diethylene glycol, propylene glycol, dipropylene glycol, polyethylene glycol, polypropylene glycol, poly(ethylene-co-propylene) glycol and the like, as well as their reaction products with alkyleneoxides including ethyleneoxide and propyleneoxide; triols containing 3 to 20 carbon atoms such as glycerine, trimethylolpropane, 1,3,5-pentanetriol, 1,2,6-hexanetriol and the like, as well as their reaction products with alkyleneoxides including ethyleneoxide, propyleneoxide, and mixtures thereof; diols containing 2 to 35 carbon atoms such as 1,5-pentanediol, 1,4-petanediol, 1,6-hexanediol, 1,5-hexanediol, 2,6-hexanediol, neopentylglycol(2,2-dimethyl-1,3-propanediol), and the like, as well as their reaction products with alkyleneoxides including ethyleneoxide and propyleneoxide in any desirable molar ratio to form materials with a wide range of molecular weight; sulfoxide derivatives containing 2 to 25 carbon atoms including dialkylsulfoxides (symmetric and asymmetric sulfoxides) such as dimethylsulfoxide, methylethylsulfoxide, alkylphenyl sulfoxides, and the like; sulfone derivatives (symmetric and asymmetric sulfones) containing 2 to 25 carbon atoms, such as dimethysulfone, methylethylsulfone, sulfolane (tetramethylenesulfone, a cyclic sulfone), dialkyl sulfones, alkyl phenyl sulfones, and the like; amides with 2 to 25 carbon atoms, such as N-alkylamides, N,N-dialkyl amides, N,N-alkyl phenyl amides, N-methylpyrrolidinone (a cyclic amide), N-cyclohexylpyrrolidinone, N,N-dimethyl-p-toluamide (aromatic), N,N-dimethyl-o-toluamide, N,N-diethyl-m-toluamide, and the like; ethers, such as alkyl ether derivatives of alcohol, ether derivatives of triols and diols including butylcarbitol, hexylcarbitol, triolethers, alkyl ethers of polyethyleneglycols, alkyl ethers of polypropyleneglycols, and the like; urea and urea derivatives; inner salts such as betaine; thio (sulfur) derivatives of the aforementioned materials (humectants) including thioethyleneglycol, thiodiethyleneglycol, trithio- or dithio-diethyleneglycol, and the like; reaction products of aforementioned materials (humectants) with alkyleneoxides; and mixtures thereof.

One of the preferred humectants or co-solvents used jointly in the embodiments of the present invention is a sulfone derivative without a hydroxyl group (nonhydroxyl sulfone derivative) including dimethylsulfone, methylethylsulfone, diethylsulfone, ethylpropylsulfone, dipropylsulfone, propylbutylsulfone, dibutylsulfone, methylphenylsulfone, sulfolane(tetramethylene sulfone), methylsulfolane, dimethylsulfolane, and the like. However, ink jet inks comprising humectants of the Formula (I) according to embodiments of the present invention may include an additional sulfone derivative only, an additional sulfone derivative in combination with other co-solvents or humectants including those mentioned previously, or may include one or more aforementioned solvents or humectants in Formula (I) without an aforementioned nonhydroxyl sulfone derivative.

The ink jet ink can also comprise a penetrant to avoid inter-color bleeding. The penetrant gives the ink, especially a color ink, a low surface tension, preferably less than 55 dyne/cm and ranging from about 20 to about 55 dynes/cm, and more preferably from about 30 to about 45 dyne/cm. The viscosity of the ink composition is usually less than 10.0 cP (centipoises), preferably from about 1.0 to about 6.0 cP, and more preferably from about 1.0 to about 5.0 cP. Penetrants include, but are not limited to, hydroxyethers (cellusolve® and alkylcellusolves®, carbitol® and alkylcarbitols® such as butylcarbitol®, pentylcarbitol®, hexylcarbitol®, and the like); alkylethers of a glycol derivatives including alkylethers of ethyleneglycol, diethyleneglycol, triethyleneglycol, tetraethyleneglycol, dipropyleneglycol, tripropyleneglycol, and tetra-propyleneglycol; polyethyleneglycol ether derivatives (e.g., methyl, ethyl, propyl, butyl, pentyl, hexyl, phenyl, and alkylphenyl ether derivatives of polyethyleneglycols); and polypropyleneglycol ether derivatives (e.g., methyl, ethyl, propyl, butyl, pentyl, hexyl, phenyl, and alyklphenyl, ether derivatives of polypropyleneglycols), N-methylpyrrolidinone, N,N-dimethyl-p-toluamide, N,N-dimethyl-o-toluamide, N,N-diethyl-m-toluamide, and the like, as well as mixtures thereof.

The ink jet ink of the present invention also comprises at least a colorant. The colorant for the ink jet ink compositions can be selected from a dye, a pigment, and a mixture of dye and pigment. The colorant can be selected from any of the suitable colorants listed in the Color Index, which is published jointly by American Association of Textile Chemist and Colorists (AATCC) and The Society of Dyers and Colorists in Bradford, England; BUYER'S GUIDE for Textile Chemist and Colorist published by AATCC, and those known in the art. The colorant may be present in the inks either with or without a dispersing agent. For example, pigment particles such as those modified chemically to possess ionizable functional groups in water such as carboxylate and sulfonate groups are stable in an aqueous ink and they do not require a dispersing agent in the ink. Some examples of those chemically modified pigments (e.g., carbon blacks) are described in U.S. Pat. No. 5,281,261 to Lin, the entire disclosure of which is incorporated herein by reference. Pigment particles which are not chemically modified require the use of at least a dispersing agent to stabilize them in the ink. The pigment dispersing agent can be selected from a group consisting of anionic, cationic, and nonionic types.

In embodiments of the present invention where dyes are used, the dye is present in the ink jet ink composition in any effective amount to provide desired color and optical density. Typically the dye is present in an amount from about 0.1 to about 15% by weight of total ink weight, and preferably from about 1.0 to about 10% by weight of total ink weight, although the amount can be outside this range. A mixture of dyes in any desired proportion may also be employed to obtain a specific shade or hue. Similarly, in embodiments of the present invention where pigments are used, the pigment may be present in the ink jet ink composition in any effective amount. Typically the pigment is present in an amount of from about 0.1 to about 15% by weight of total ink weight and preferably from about 1 to about 10% by weight of total ink weight, although the amount can be outside of this range.

Where both dyes and pigments are incorporated into the ink jet ink composition, the weight percentage of the combined colorant may be adjusted accordingly.

The ink jet ink composition may contain a dye colorant. Any suitable dye or mixture of dyes compatible with the ink liquid vehicle can be used, with water soluble anionic dyes, direct dyes, reactive dyes, and cationic dyes being preferred. Examples of suitable dyes include, but are not limited to, Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza [18] annulenes, Formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor A. Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Hoechst, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof.

Pigment may also be used in the ink jet ink composition of the present invention. The pigment can be of any desired color, such as black, cyan, magenta, yellow, red, blue, green, brown, or the like, as well as mixtures thereof. It is preferable that the color of the pigment particles is either similar to or the same as the color of another colorant in a mixture so there is no interference or impairment of the desired color of the final ink. Examples of suitable pigments in the ink jet ink compositions include various carbon blacks such as channel blacks, furnace blacks, lamp blacks, Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine(r) Rubine F6B (Pigment 184 ), Hostafine(r) Blue 2G (Pigment Blue 15:3), Hostafine(r) Black T (Pigment Black 7), and Hostafine® Black TS (Pigment Black 7), available from Hoechst Celanese Corporation, Normandy Magenta RD-2400 (Paul Uhlich), Paliogen Violet 5100 (BASF), Paliogen® Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen® Blue L6900, L7020 (BASF), Heliogen® Blue D6840, D7080 (BASF), Sudan Blue OS (BASF), PV Fast Blue B2GO1 (American Hoechst), Irgalite Blue BCA (Ciba-Geigy), Paliogen® Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen® Orange 3040 (BASF), Ortho Orange OR 2673 (Paul Uhlich), Paliogen® Yellow 152, 1560 (BASF), Lithol Fast Yellow 0991K (BASF), Paliotol Yellow 1840 (BASF), Novoperm® Yellow FG 1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm® Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen® Red 3871K (BASF), Paliogen® Red 3340 (BASF), and Lithol Fast Scarlet L4300 (BASF).

The preferred pigments for the ink jet inks of the present invention are nontoxic and nonmutagenic materials. They show a negative response in an AMES test for mutagenic material. Nonmutagenic and noncarcinogenic carbon blacks and color pigments are desired in ink jet inks for safety reasons. For example, it is desired to have pigments, including carbon blacks and color pigments, that have a very low concentration of polyaromatic hydrocarbons, which are known to be carcinogenic or mutagenic. For illustrative purposes, nitropyrene, pyrene, tetracene, pentacene, and many other polyaromatic hydrocarbons in many commercial carbon blacks and color pigments are considered to be toxic at a concentration greater than 5 parts per million. Thus, it is desirable to limit the amount of such toxic polyaromatic hydrocarbons in the pigments to less than 5 parts per million for the preparation of nontoxic ink jet inks. Many commercial carbon blacks and colored pigments have a concentration of polyaromatic hydrocarbons exceeding 5 parts per million and, therefore, the inks derived from such pigments are generally considered to be toxic or failing to pass the AMES test (possible mutagenic). However, many nontoxic carbon blacks and color pigments including Raven® 5250, Raven® 5750, Regal® 330, Black Pearl® 1300, Black Pearls® L, Vulcan® XC-7, Hostapern® pink E, Hostaperm® blue (a phthalocyanine derivative) and other pigments are generally used in toners and other imaging applications. Those carbon blacks and color pigments usually have a polyaromatic hydrocarbon content of less than 1 part per million, which is below the limit of 5 parts per million that is considered toxic. They do not show positive response in the AMES test and are considered to be safe in toner and ink jet ink applications.

Preferably, the pigment particle size is as small as possible to enable a stable colloidal suspension of the particles in the liquid vehicle with good color strength and to prevent clogging of the ink channels or nozzle openings when the ink is used in an ink jet printer. Preferred average particle sizes or diameters are generally varying from about 0.001 to about 3 microns, although the particle sizes can be outside these ranges in embodiments. A more preferred pigment particle size in the inks of the present invention includes particles having at least 50% of the particles being below 0.3 micron with no particles being greater than 3.0 micron (measured on a Hodaka CAPA 700 Particle Size Analyzer). More preferably, the average pigment particle size includes particles having at least 70% of the particles being below 0.3 micron with no particles being greater than 1.2 micron. However, pigment particle sizes can be outside of these ranges provided that they do not cause undesired precipitation and clogging.

In embodiments of the present invention, the pigment may be dispersed in the ink with one or more dispersants. The dispersants can be anionic, cationic, and nonionic types. Some preferred dispersants have both hydrophilic (comprising ionic groups which are capable of ionizing in water) and hydrophobic (affinity for pigments) moieties. Suitable dispersants include, but are not limited to, anionic dispersants, such as polymers and copolymers of styrene sulfonate salts (such as $Na^+$, $Li^+$, $K^+$, $Cs^+$, $Rb^+$, substituted and unsubstituted ammonium cations, and the like), unsubstituted and substituted (e.g., alkyl, alkoxy, substituted naphthalene derivatives, and the like) naphthalene sulfonate salts (such as $Na^+$, $Li^+$, $K^+$, $Cs^+$, $Rb^+$, substituted and unsubstituted ammonium cations, and the like) and an aldehyde derivative (such as unsubstituted alkyl aldehyde derivatives including formaldehyde, acetaldehyde, propylaldehyde, and the like), and the like, as well as mixtures thereof. Examples of such pigment dispersants include, but are not limited to, commercial products such as Versa® 4, Versa® 7, Versa® 77 (National Starch and Chemical Co.); Lomar® D (Diamond Shamrock Chemicals Co.); Daxad® 19, Daxad® K (W.R. Grace Co.); Tamol® SN (Rohm & Haas); and the like. Other useful pigment dispersants (anionic) include polymer or copolymers of styrene and an acrylic acid salt, styrene and a methacrylic acid salt, styrene and a maleic acid salt, and the like, as well as mixtures thereof.

Also, nonionic dispersants or surfactants can be used in ink jet inks of the present invention, such as ethoxylated monoalkyl or dialkyl phenols including Igepal® CA and CO series materials (Rhone-Poulenc Co., e.g., Igepal® CA-630, CO-630, etc.); and Triton® series materials (Union Carbide Company). These nonionic surfactants or dispersants can be used alone or in combination with the aforementioned anionic or cationic dispersants.

The ratio of pigment to aforementioned pigment dispersant(s) according to the present invention ranges from about 1/0.01 to about 1/3, preferably from about 1/0.1 to about 1/1, and most preferably from about 1/0.10 to about 1/0.75. The ratio of naphthalene substituent to aldehyde (e.g., formaldehyde, acetaldehyde, etc.) in the aforementioned anionic dispersant is approximately about 1:1, although this ratio can be different depending on the stoichiometry of the feed stock and reaction condition, and can readily be adjusted to obtain a dispersant having a desired molecular weight and the desired ratio of naphthalene substituent to aldehyde. The remainder of the dispersant may comprise nonactive ingredients such as water, solvent or humectant. The weight-average molecular weight of the dispersant is generally less than 20,000, preferably less than 13,000, and more preferably less than 10,000. The pigment dispersion should contain enough dispersant to stabilize the pigment particles in water, but not so much as to adversely affect properties of the pigment dispersion and ink such as viscosity, stability, and optical density. Stable pigment dispersions comprising the desired dispersing agent or dispersant can be used in ink jet inks of the present invention.

The ink jet inks of the present invention, particularly dye based inks, may optionally include a water soluble or miscible microwave coupler. The microwave coupler can be selected from any of the known microwave couplers, and can be an organic or inorganic salt or a nonionic microwave coupling agent that allows an ink to be dried quickly by a microwave heating device. The ionic type microwave coupler can be selected from an organic or inorganic salt that allows an ink to be dried quickly by a microwave heating device. The microwave coupler can be, for example, a salt that provides the ink jet ink with a desirable conductivity and coupling efficiency. The salts or ionic compounds exhibit a high degree of ionization in aqueous inks with good electrical conductivity and are capable of coupling with a heating device such as a microwave device for drying ink and avoiding intercolor bleeding when the inks are printed next to, for example, a pigment based ink which is stabilized by an anionic dispersant. Those ionic compounds typically include metal and ammonium salts of inorganic and organic acids with cations and anions. Typical cations of salts include, but are not limited to, $H^+$, $NH_4^+$, $Cs^+$, $K^+$, $Na^+$, $Li^+$, $Ca^{2+}$, $Mg^{2+}$, $Zn^{2+}$, $Ni^{2+}$, $Mn^{2+}$, $Co^{2+}$, $Sr^{2+}$, $Cd^{2+}$, $Ba^{2+}$, $Fe^{2+}$, $Cu^{2+}$, $Ga^{3+}$, $In^{3+}$, $Cr^{3+}$, $Pr^{3+}$, $Nd^{3+}$, $Y^{3+}$, $Al^{3+}$, $Fe^{3+}$, lanthanide cations, actinide cations, and the like. The anions of the salts include, but are not limited to, halides ($I^-$, $Br^-$, $Cl^-$, and $F^-$), chlorate ($ClO_3$), $OH^-$, $NO_3^-$, $SO_4^{2-}$, $CH_3CO_2^-$, $CH_3CH_2CO_2^-$, $C_6H_5CO_2$, $C_6H_5SO_3^-$, various ethylenediaminetetraacetic acid (EDTA) anions, and the like. Metals salts of monovalent and multi-valent salts can also be used in ink jet inks of the present invention for the reduction of intercolor bleeding (bleed near the border of two different inks) either through microwave heating of the images or chemical interaction with anionic type colorants (e.g., anionic dyes, pigments stabilized with anionic dispersants, pigments with anionic functional group(s) on the surface, and the like) in the presence or absence of heat in a multi-color ink jet printing process (e.g., involving the printing of black, cyan, magenta, and yellow inks or more inks).

The use of those ammonium and mono- and multi-valent metal salts are desirable to be compatible with the ink components of the present invention comprising water, the aforementioned diol derivatives of the present invention, colorants including dyes and pigments, and other optionally selected ink or chemical additives. They are chosen so that they will not cause a latency or a jetting problem especially for a high resolution printhead with a small orifice size. In embodiments of the present invention, the metal and ammonium salts of inorganic and organic acids with cations and anions (salts of monovalent and multi-valent) can be included in the ink jet inks in an amount of from about 0 to about 15% by weight of total ink weight, and preferably in an amount of from about 0 to about 8% by weight of total ink weight, although they can be outside this range.

The diol derivative humectants in the ink jet inks of the present invention have a high surface tension and are suitable for formulating inks with excellent print quality for plain paper. They can also be used in both fast dry inks (surface tension<45 dyne/cm at room temperature) and slow dry inks (surface tension≧45 dyne/cm at room temperature). Low surface tension of ink jet inks provides fast penetration and drying of the inks on plain papers without smearing and intercolor bleeding problems. The diol derivatives of the present invention can be used in pigment inks comprising either with or without chemically modified pigments or grafted pigments. Chemically modified pigment comprises hydrophilic groups (e.g. carboxylic acid salts, sulfonate salts, etc.) which can be ionized in an aqueous medium to form stable ink jet ink. If necessary, pigment inks can also be prepared with a suitable dispersing agent (cationic, anionic, and nonionic) with good stability. The diol derivatives of the present invention are compatible with many known humectants, surfactants, dispersing agents, penetrants, and other optional ink additives for the fabrication of useful ink jet inks.

The ink jet inks of the present invention may optionally include a jetting aid such as polyethyleneoxide (<5% by weight) or a small quantity (<0.1% by weight) of stabilized pigment particles. A preferred polyethyleneoxide is one having a weight-average molecular weight of about 18,500. However, the molecular weight of the useful jetting aid can be different. The jetting aid provides smooth jetting or jetting with low jitter and it is particularly useful in dye-based ink jet inks.

Other desired chemical additives including surfactants, water soluble polymers, pH buffers, biocides, chelating agents (EDTA and the like), and other optional additives can also be optionally used in inks of the present invention. Such additives can generally be added to ink jet inks of the present invention in known amounts for their known purpose.

Chemical additives such as surfactants or wetting agents can be added to the ink. These additives may be of the anionic or nonionic types. Suitable surfactants and wetting agents include, but are not limited to, Tamol SN®, Tamol LG®, and those of the Triton® series (Rohm and Haas Co.); those of the Marasperse® series and those of the Igepal® series (Rhone-Poulenc Co., formerly from GAF Co.); those of the Tergitol® series and those of the Duponol® series (E.I. Du Pont de Nemours & Co.); Surfynol Series (Air Products Inc.), Iconol® Series (BASF Co.), Briji® Series (ICI Americas Inc.), Pluronic® Series (BASF Co.), Emulphor® ON 870 and ON 877 (GAF); and other commercially available surfactants. These surfactants and wetting agents may be present in the pigment dispersion in effective amounts, generally from 0 to about 15 percent by weight of total ink weight, and preferably from about 0.001 to about 10 percent by weight of total ink weight, and more preferably from about 0.01 to about 8 percent by weight of total ink weight, although the amount can be outside these ranges.

Polymeric chemical additives can also be added to the ink jet inks of the present invention to enhance the viscosity of the ink. Suitable polymeric additives include, but are not limited to, water soluble polymers such as Gum Arabic, polyacrylate salts, polymethacrylate salts, polyvinyl alcohols, hydroxypropylcellulose, hydroxyethylcellulose, polyvinylpyrrolidinone, polyvinylether, starch, polysaccharides, polyethyleneimines derivatized with ethylene oxide and propylene oxide, such as the Discole® series (DKS International); the Jeffamine® series (Texaco); and the like. Polymeric additives may be present in the ink jet inks of the present invention in amounts of from 0 to about 10 percent by weight of total ink weight, preferably from about 0.001 to about 8 percent by weight of total ink weight, and more preferably from about 0.01 to about 5 percent by weight of total ink weight, although the amount can be outside these ranges.

Other optional additives for the ink jet inks of the present invention include biocides such as Dowicil 150, 200, and 75, benzoate salts, sorbate salts, Proxcel® (available from ICI), and the like. When used, such biocides are generally present in an amount of from 0 to about 10 percent by weight, preferably from about 0.001 to about 8 percent by weight, and more preferably from about 0.01 to about 4.0 percent by weight, although the amount can be outside these ranges. Ink jet inks of the present invention may also include pH controlling agents. Suitable pH controlling agents or buffering agents include, but are not limited to, acids, bases, phosphate salts, carboxylate salts, sulfite salts, amine salts, and the like. When used, such pH controlling agents are generally present in an amount of from 0 to about 10 percent by weight of total ink weight, preferably from about 0.001 to about 5 percent by weight of total ink weight, and more preferably from about 0.01 to about 5 percent by weight of total ink weight, although the amount can be outside these ranges.

The diol derivatives of the present invention can also be used in conjunction with other chemical additives including some known viscous anti-cockle and anti-curl agents in ink jet inks to improve the inks' physical properties (e.g., jetting performance, etc.). At equal humectant concentration, some of the diol derivatives of the present invention have lower viscosity at room temperature than many commonly known diol humectants including diethyleneglycol, dipropyleneglycol polyethyleneglycol, and polypropyleneglycol as well as some known viscous anti-cockle and anti-curl agents (e.g., triols, polymeric triols, reaction products of a diol or triol and ethylenoxide or propyleneoxide, etc.). Inks comprising those known relatively viscous anti-cockle and anti-curl agents at a desired concentration may have undesired high viscosity which can cause poor ink jetting performance (particularly in a high resolution printhead) such as low drop velocity, short latency, low frequency response, low printing speed, jitter, and misdirectionality. However, the replacement of those known viscous anti-cockle and anti-curl agents or humectants in the inks with the less viscous humectants or anti-curl agents of the present invention can reduce the risk of poor latency and jetting performance of ink jet inks while maintaining good anti-curl and anti-cockle properties. The humectants or anti-curl agents of the present invention are advantageous due to their low viscosity. The diol derivatives of the present invention can be used to replace other known humectants or anti-curl agents in ink jet ink formulations. Low ink viscosity of the materials used in the present invention allows fast ink refill in a channel of an ink jet printhead and provides smooth jetting at a high printing speed without causing an air ingestion problem and poor jetting performance.

The ink jet inks of the present invention also possess good latency and high frequency response. Some examples of the inks of the present invention have shown latency data of about 20 seconds or more when a high resolution 600 spi printhead is employed. Maximum frequency response of at least 8–10 KHz is observed when the inks of the present invention are used in a high resolution printhead of 600 spi. Since the ink jet inks of the present invention have low viscosity, they can also be used in ink jet printheads with a resolution $\geqq 600$ spi including 720 spi or more. If full-width array printheads (e.g., black, cyan, magenta, and yellow printheads) are used in a multi-color printing process, a printing speed of 50 pages per minute or more can be achieved. Thus, inks comprising the diol derivatives of the present invention can potentially be printed on a print substrate to produce color images at a very high speed. If it is desired, inks comprising the diol derivatives of the present invention can also be printed at any speed lower than 50 pages per minute (e.g. 1, 5, 10, 20, 30, 40 pages per minute) using desired printheads selected from single printheads, partial-width printheads, and full-width array printheads.

The ink jet inks of the present invention may be applied to a suitable substrate in an image-wise fashion according to digital data signals. Application of the ink onto the substrate can also be made by any suitable printing process compatible with aqueous-based inks, including flexographic printing, pen plotters, continuous stream ink jet printing, drop-on-demand ink jet printing (including piezoelectric, acoustic and thermal ink jet printing processes), and the like.

The print substrate employed can be any substrate compatible with aqueous-based inks. The print substrates include, but are not limited to, textiles, plain papers, such as Xerox® series 10 paper, Xerox® 4024 paper, commercial bond papers and the like; coated papers (or special ink jet papers including photo-realistic ink jet papers), such as those available from Hewlett-Packard, Canon, Eastman Kodak Co., Oji Paper Co., and Xerox Corporation; ink jet transparencies suitable for aqueous inks or ink jet printing processes, including those from Artright Co., Hewlett-Packard Co., Canon Co., Asahi Co., and Xerox Corporation, as well as materials from other commercial sources.

In the ink jet ink printing process, the ink jet inks of the present invention may be printed on a print substrate in a single or multiple pass mode by a single printhead, or a partial-width printhead, or a full-width array printhead in an imagewise manner according to the digital data signals. In this ink jet printing process the print substrate and imaged inks can be optionally dried either with or without heat at any stage of the printing process including before, during, and after the printing as well as their combinations thereof. The heat can be applied by a microwave dryer or device. In addition to microwave heating, the inks of the present invention on the print substrate can also be dried at any stage of the ink jet printing process including before, during, after, and combinations thereof by a means or method including a radiant heater, a hot plate, a hot roller or drum, a heating element, a lamp, and the like. The drying of the print substrate and inks improves print quality and increases printing speed.

If a multi-color image on a print substrate is needed, a multi-color ink jet printing process is employed. The multi-color thermal ink jet printing process may comprise: (a) a set of at least four different ink jet inks (e.g. consisting of black (K), cyan (C), magenta (M), and yellow (Y) inks) and at least one of the four different ink jet inks comprises water, a colorant selected from a dye, a pigment and mixture thereof, and at least a diol derivative of the present invention selected from the Formula (I) and the materials mentioned previously, (b) applying the set of at least four ink jet inks (K, C, M, and Y) in an imagewise manner onto a print substrate using a single or multiple pass (checkerboard) method in any desired printing sequence according to the digital data signals by their corresponding printheads (K, C, M, and Y) which can be independently selected from a single printhead, a partial-width printhead, and a full-width array printhead, and (c) optionally applying heat to the print substrate and imaged inks at any stage of ink jet printing process including before, during, and after printing as well as combinations thereof.

The multi-color ink jet printing process produces excellent color images on the print substrate including plain papers, coated papers (e.g., silica coated papers, etc.), ink jet papers including photo-realistic ink jet papers, textiles, and ink jet transparencies at a fast speed with sharp edges and very low intercolor bleeding. Furthermore, the color images on the print substrate also have reduced cockle and paper curl.

There are many other advantages of using the diol derivatives of the present invention in ink jet inks. The inks according to the present invention are thermally stable and suitable for applications of thermal ink jet technology especially at high temperatures and high speed printing due to a high frequency response.

Aqueous ink jet inks according to the present invention provide numerous benefits including high image resolution, excellent print quality on a variety of substrates including plain and coated papers, excellent jetting capability with high drop velocity, long latency, large drop mass or drop volume that provides optimal optical density. The inks of the present invention have low viscosity and high frequency response that allows them to be used in an ink jet printing process (including a multi-color ink jet printing process) with printheads such as single printhead, partial-width array printhead, and full-width array printheads for high speed (e.g. $\geqq 50$ pages per minute which far exceeds the speed of current commercial thermal ink jet printers) and high resolution (e.g., 400 spi, 600 spi, etc.) ink jet printing with excellent printhead recoverability, good anti-clogging, anti-curl and anti-cockle properties. The inks of the present invention can be formulated to provide excellent ink stability, easy maintainability, and a lack of undesired printhead kogation (or undesired heater deposit or degradation in jetting performance).

Specific embodiments of the present invention will now be described in detail. These examples are intended to be illustrative only, and the invention is not limited to the materials, conditions or process parameters set forth in these embodiments. Other embodiments and modifications of the present invention may occur to those skilled in the art subsequent to a review of the information presented herein. These embodiments and modifications, as well as equivalents thereof, are also included within the scope of the present invention. All parts and percentages are by weight, unless otherwise indicated.

EXAMPLES

Example I

A cyan ink (a reference ink) was prepared with the following composition: Acid Blue 9 (1.0%), diethyleneglycol (0.2%), trimethylopropropane (TMP, 11.0%), dipropyleneglycol 2.0%), and water (balance).

Example II

A set of aqueous color inks (CH3 cyan ink (IIA), CH3 magenta ink (IIB), and CH3 yellow ink (IIC), a cyan ink (IIF), and two black inks (IID and IIE)) were prepared without the novel diol derivatives of the present invention and used in paper curl studies as references. The compositions of these inks in weight percentage of total ink weight are shown below:

(1) IIA cyan ink: Project cyan dye (ICI, 10% dye in liquid concentrate, 3.5% dye solid), butylcarbitol (10.0%), N-cyclohexylpyrrolidinone (2.0%), sulfolane (15.0%), polyethyleneoxide (MW=18.5K, 0.07%), and water (balance);

(2) IIB magenta ink: Mitsubishi magenta dye (dye concentrate containing 4.0% dye solid), butylcarbitol (10.0%), N-cyclohexylpyrrolidinone (2.0%), sulfolane (15.0%), polyethyleneoxide (MW=18.5K, 0.05%), and water (balance);

(3) IIC yellow ink: Project Yellow 1G (liquid concentrate containing total 4.0% solid dye), butylcarbitol (10.0%), N-cyclohexylpyrrolidinone (2.0%), sulfolane (15.0%), polyethyleneoxide (Ave. MW=18.5K, 0.03%), and water (balance);

(4) IID black Ink: 3.45% BASF X-34 Black dye solid (corresponding to 11.5% black dye concentrate which has 30% black dye concentration), 20% ethyleneglycol, 0.05% Polyethyleneoxide (Ave. MW=18.5K), 0.1% Dowicil, and water (balance). The black ink has a viscosity of 2.1 cP(centipoises);

(5) IIE black ink: BASF X-34 Black dye(5.19% solid dye corresponding to 17.3% dye concentrate which has 30% black dye concentration), 20% ethyleneglycol, 0.05% polyethyleneoxide (Ave. MW=18.5K), 0.1% Dowicil, and water (balance). The black ink has a viscosity of 2.3 cP;

(6) IIF cyan ink: Project cyan 1 dye (3.0% dye solid corresponding to 30% dye concentrate which has 10% dye concentration), 20% ethyleneglycol, 2.5% benzyl alcohol, 1.9% ammonium chloride, 0.1% Dowicil 200, 0.05% polyethyleneoxide (MW=18.5K), and water (balance).

Example III

A cyan ink that has very good anti-curl property was prepared with the following composition: Acid Blue 9 cyan dye (1.8%), 2,2'-sulfonyldiethanol(20.0%), 2-(2-n-butoxyethoxy) ethanol (butylcarbitol, 2%), polyethyleneoxide (0.075%, MW=18.5K), Dowicil 200 (0.05%0, Igepal CA-630, and water (distilled water, balance).

The above ingredients were thoroughly mixed and the pH was adjusted to neutral. The mixture was filtered through a series of membrane filters (5, 1.2 and 0.8 microns) to produce the ink. The ink has a surface tension of 31.5 dyne/cm and a relatively low viscosity of 1.49 cP at 25° C. as compared to black ink IID, which has a comparable of humectant concentration and a viscosity of 2.1 cP.

Example IV

Hewlett Packard HP-1200C black (IV A) and color inks (yellow ink (IV B), cyan ink (IV C, viscosity =2.3 cP), and magenta ink (IV D)) were also used in the paper curl studies.

The inks in Examples I–IV were used in the paper curl studies to demonstrate the anti-curl property of the ink of the present invention. A Hewlett Packer HP-1200C thermal ink jet printer was employed to print solid area of each ink on different plain papers (print substrates) using either high quality mode (multiple pass mode or method) or normal mode (method) or paper fast mode (method) with a radiant heater to help drying. A large solid area of each ink (about 8 1/16"×10 1/4") was printed on each 8 1/2"×11" paper with four surrounding white borders. The heating of a print substrate was carried out before, during, and after the printing of an ink by the heating means provided by the printer. Various plain papers with different sizing, paper weight, and fabrication process are employed. Plain papers including 1T(Xerox 4200, Champion Pensacola), 2T(Xerox 4200 DP, GP Ashdown), 3T(Xerox Recycled DP, Domtar Cornwall), 4T(Hammermill Tidal DP, Oswego # 8), 5T(Union Camp, Jamestown DP Franklin), 6T(Springhill Relay DP, Ticonderoga), 7T(Xerox Image Series LX 24# Ashdown), 8T(Hammermill 16 #), 9T(Xerox Image Series 32#), 10T (Gilbert Bond 25% Cotton), and 11T (Strathmore Bond) were used in printing and curl evaluations. After the printing of each ink, the imaged papers were allowed to dry at room temperature in an opened tray (the imaged side up) under ambient conditions of the laboratory for at least several days or up to one year before measuring the curl properties. Long-term paper curl data of the inks of the present invention were recorded to demonstrate their excellent anti-curl property. In general, after printing the solid area onto papers the curl property of the imaged papers became worse upon aging or long-term storage. Paper curl data were measured in terms of average paper heights (in centimeter, cm) for four corners of a paper and average paper heights (in centimeter, cm) of two centers of the long side of a paper (centers of 11" side). A large number of the average paper height (either corner or center height) indicates poor paper curl property for an ink (e.g. Ink IIA) due to undesired ink/paper interaction. Some of the paper curl results are shown in Tables I and II. The data clearly indicate that the inks of the present invention have excellent anti-curl properties.

TABLE I

Paper Curl property of Ink Jet Inks

| Paper Type | Ink | Avg.Corner Height(cm) | Avg.Center Height(cm) | Optical Density |
|---|---|---|---|---|
| 12T,Xerox (Recycled) | IVC (Cyan, HP-1200C) | 0.65 | 0.70 | 1.17 |
| 12T,Xerox (Recycled) | I | 2.1 | 2.20 | 0.89 |

TABLE I-continued

Paper Curl property of Ink Jet Inks

| Paper Type | Ink | Avg.Corner Height(cm) | Avg.Center Height(cm) | Optical Density |
|---|---|---|---|---|
| 12T,Xerox (Recycled) | III* | 0.35* | 0.40* | 1.18 |
| Xerox 4024DP Cortland | I | 1.60 | 1.80 | — |
| Xerox 4024DP Cortland | IIA | 3.80 | 3.80 | — |
| Xerox 4024DP Cortland | IV C | 0.40 | 0.30 | — |
| Hammermill Fore DP, (16 Lb.)8T | IV C | 1.20 | 1.30 | — |
| Hammermill Fore DP, (16 Lb.)8T | I | 2.10 | 2.30 | — |
| Hammermill Fore DP, (16 Lb.)8T | IIA | 5.30 | 5.10 | — |
| Gilbert Bond, 25% Cotton | I | 0.70 | 0.60 | — |
| Gilbert Bond, 25% Cotton | IIA | 2.40 | 2.60 | — |
| Gilbert Bond, 25% Cotton | IVC (Cyan, HP-1200C) | 1.10 | 0.90 | — |
| Gilbert Bond, 25% Cotton | III* | 0.20* | 0.05* | 1.27 |

*Curl data of the ink of the present invention were collected after one year of printing and drying. All other curl data were collected in less than one week after printing and drying under ambient conditions at room temperature in the laboratory. High quality mode was used for the printing. Significant reduction of paper curl was observed for the ink (III) of the present invention.

TABLE II

Paper Curl Data of a Cyan Ink (III)

| Paper Type | Corner Height(cm) | Center Height(cm) | Optical Density |
|---|---|---|---|
| 1T | 0.30 | 0.30 | 1.16 |
| 2T | 0.075 | 0.05 | 1.18 |
| 3T | 0.35 | 0.40 | 1.20 |
| 4T | 0.40 | 0.35 | 1.22 |
| 5T | 0.20 | 0.10 | 1.19 |
| 6T | 0.40 | 0.40 | 1.14 |
| 7T | 0.25 | 0.05 | 1.28 |
| 8T | 0.53 | 0.05 | 1.20 |
| 9T | 0.05 | 0.10 | 1.22 |
| 10T | 0.20 | 0.05 | 1.27 |
| 11T | 0.10 | 0.10 | 1.23 |
| Average | 0.28 | 0.18 | 1.21 |

All paper curl data in this Table (Table II) were obtained after printing and drying under ambient conditions in the laboratory at room temperature for at least one year. Aging of the imaged papers was much longer than one year and the data are presented in the Table I. The data clearly suggest excellent anti-curl properties of the inks of the present invention. Long aging time does not cause paper curl problem for this ink (Example III).

Example V

An ink jet ink comprising the following composition was prepared and tested for jetting performance including latency, frequency response, and drop mass: Acid Blue 9 (1.8%), 2,2-sulfonyldiethanol (15.0%), butylcarbitol (2.0%), tetramethylenesulfone (sulfolane, 5%), polyethyleneoxide (0.075%, MW=18.5K), Dowicil 200 (0.05%), Igepal CA-630 (surfactant, 0.1%), and water (balance). Viscosity of this ink was 1.4 cP at 25° C.

Example VI

An ink jet ink comprising the following composition was prepared and tested for jetting performance including latency, frequency response, and drop mass: Acid Blue 9 (1.8%), 2,2-sulfonyldiethanol (10.0%), butylcarbitol (2.0%), tetramethylenesulfone (sulfolane, 10.0%), polyethyleneoxide (0.075%, MW=18.5K), Dowicil 200 (0.05%), Igepal CA-630 (surfactant, 0.1%), and water (balance).

The above ingredients were thoroughly mixed and the pH was adjusted to neutral. The mixture is filtered through a series of membrane filters (5, 1.2 and 0.8 microns) to produce the ink. Viscosity of this ink is 1.4 cP at 25° C. The ink does not have undesired kogation or heater deposit.

Example VII

An ink jet ink comprising the following compositions was prepared and tested for jetting performance including latency, frequency response, and drop mass: Acid Blue 9 (1.8%), 2,2-sulfonyldiethanol (5.0%), butylcarbitol(2.0%), tetramethylenesulfone (sulfolane, 15.0%), polyethyleneoxide (0.075%, MW=18.5K), Dowicil 200 (0.05%), Igepal CA-630 (surfactant, 0.1%), and water (balance).

The above ingredients were thoroughly mixed and the pH was adjusted to neutral. The mixture is filtered through a series of membrane filters (5, 1.2 and 0.8 microns) to produce the ink. Viscosity of this ink was 1.38 cP at 25° C.

Example VIII

A magenta ink was prepared comprising the following composition: Acid Red 52 (1.43%), Reactive Red 180 (2.4%), 2,2'-sulfonyldiethanol (18.0%), betaine (2.0%), butyl carbitol (2.0%), polyethyleneoxide (MW=18.5 K, 0.05%), Dowicil 200 (0.05%), Igepal CA-630 (0.1%), and water (balance). The ink was adjusted to neutral pH and filtered through 5.0 and 1.2 microns filters. The ink has a low viscosity at 25° C. and good anti-curl property.

Example IX

A yellow ink was prepared comprising the following composition: Acid yellow 23 dye (2.0%), 2,2'-sulfonyldiethanol (17.0%), tetraethyleneglycol (3.0%), butyl carbitol® (2.0%), polyethyleneoxide (MW=18.5K, 0.05%), Dowicil 200 (0.05%), Igepal CA-630 (0.1%), and water (balance). The ink was adjusted to neutral pH and filtered through 5.0 microns and 1.2 microns membrane filters. The ink has a low viscosity at 25° C. and good anti-curl property.

Example X

A carbon black ink (pigment ink) was prepared with the following composition: Levanyl carbon black (5.0%), Lomar D (an anionic dispersing agent, 0.3%), sulfonyldiethanol (20.0%), Dowicil 200 (0.05%), and water (balance). The ink was thoroughly mixed, sonified, centrifuged, and filtered through 5.0 microns and 1.2 microns filters. The carbon black ink has a low viscosity at 25° C. and good anti-curl property.

Jetting performance of several ink jet inks was carried out at 35° C. at 15% relative humidity (RH) using a 600 spi printhead with a narrow printhead nozzle opening (or size) of 23±2 microns. Latency was measured under the aforementioned conditions and defined as the maximum idling time for successful firing an ink drop with the transit time of the ink traveling a distance of 0.5 mm in less than 100 microsec(microseconds). The second drop latency is defined as the maximum idling time for successful firing second ink drop after the first firing, with the transit time of the ink traveling a distance of 0.5 mm in less than 100 microsec. The 9th drop latency is defined as the maximum idling time for successful firing an ink drop after 8 firing pulses (drops) with the transit time of the ink traveling a distance of 0.5 mm in less than 100 microsec. The long latency time of an ink reflects good nonclogging property of an ink. The ink with long latency requires less frequency of printhead maintenance. The drop mass is determined by dividing the weight loss of an ink by the number of ink drop fired. The latency results are shown in Table III.

TABLE III

Jetting Performance of Ink Jet Inks Using a 600 SPI Printhead

| Inc. | Latency Sec. | $2^{nd}$ Drop Latency, Sec. | 9th Drop Latency, Sec. | Freq. Response KHz | Drop mass, ng/drop |
|---|---|---|---|---|---|
| IID | 10 | — | — | — | — |
| IIE | 5 | — | — | — | — |
| HP-1200C Cyan Ink, IVC | 10 | — | — | 7.0 | — |
| HP-1200C Yellow Ink, IVB | 20 | — | — | 6.0 | — |
| IIF | 20 | — | 10 | 6.0 | 17.9 |
| Ink V | 25 | 75–100 | 200–500 | 8.0 | 17.1 |
| Ink VI | 30 | 75–100 | 200–500 | 9.0–10.0 | 16.7 |
| Ink VII | 100 | >200 | 1000 | 8.0 | 17.4 |

Examples V, VI, and VII of the present invention show significantly improved latency data as compared to other ink jet inks (reference inks) in Table III. The inks of the present invention also have high frequency response (e.g. at least 8–10 K Hz) which allows them to be used in a high resolution and a high speed ink jet printing process. This is particularly true when the inks of the present invention are printed with full-width array ink jet printheads (e.g. in the multi-color ink jet printing process).

What is claimed is:

1. An aqueous ink jet ink comprises water, a colorant of dye or pigment, and a diol derivative represented by the following formula (Formula (I)):

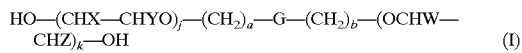

HO—(CHX—CHYO)$_j$—(CH$_2$)$_a$—G—(CH$_2$)$_b$—(OCHW—CHZ)$_k$—OH     (I)

wherein G is independently selected from the group consisting of SO$_2$, SO, and CO; and X, Y, W, and Z are independently selected from the group consisting of H, CH$_3$, and C$_n$H$_{2n+1}$ where n equals 2 to about 20; j and k independently equal from 0 to about 100; and a and b independently equal from 1 to about 20.

2. The aqueous ink jet ink according to claim 1, wherein said diol derivative is selected from the group consisting of 2-hydroxyethyl,3'-hydroxypropyl sulfone; 2,2'-sulfonyldiethanol(bis(2-hydroxyethyl)sulfone); 3,3'-sulfonyldipropanol(bis(3-hydroxypropyl)sulfone); 3-hydroxypropyl,4'-hydroxybutyl sulfone; 4,4'-sulfonyldibutanol(bis(4-hydroxybutyl)sulfone); 2-hydroxyethyl,3'-hydroxypropyl sulfoxide; 2,2'-sulfoxydiethanol(bis(2-hydroxyethyl)sulfoxide); 3,3'-sulfoxydipropanol(bis(3-hydroxypropyl)sulfoxide); 3-hydroxypropyl,4'-hydroxybutyl sulfoxide; 4,4'-sulfoxydibutanol(bis(4-hydroxybutyl)sulfoxide; 2-hydroxyethyl,3'-hydroxypropyl ketone; 2,2'-carbonyldiethanol(bis(2-hydroxyethyl)ketone); 3,3'-carbonyldipropanol (bis(3-hydroxypropyl)ketone); 3-hydroxypropyl, 4'-hydroxybutylketone; 4,4'-carbonyldibutanol(bis(4-hydroxybutyl)ketone), their reaction products with alkyleneoxide derivatives and mixtures thereof.

3. An aqueous ink jet ink comprises a hydroxysulfone derivative comprising at least two hydroxyl groups and one sulfone group and may be selected from the group consisting of 4,4'-sulfonyl-bis(2,6-dimethylphenol), cis and trans 3,4-dihydroxysulfolanes, cis and trans 3,5-dihydroxy-pentamethylenesulfurdioxides, their isomers, reaction products of the aforementioned diol derivatives with alkyleneoxides and mixtures thereof.

4. The aqueous ink jet ink according to claim 1, wherein said diol derivative is in an amount from about 0.1% to about 40.0% by weight.

5. The aqueous ink jet ink according to claim 1, further comprises at least an additive selected from the group consisting of known humectants, co-solvents, surfactants, penetrants, jetting aids, biocides, anti-curl agents, anti-cockle agents, pigment dispersing agents, mono-valent or multi-valent metal salts, pH buffering agents, and chelating agents.

6. The aqueous ink jet ink according to claim 5, wherein said humectant is selected from the group consisting of glycol derivatives; triols containing 3 to 20 carbon atoms, and their reaction products with alkyleneoxides; diol derivatives containing 2 to 35 carbon atoms; sulfoxide derivatives containing 2 to 25 carbon atoms; sulfone derivatives containing 2 to 25 carbon atoms; amides with 2 to 25 carbon atoms; ethers; urea and urea derivatives; betaine; thio derivatives of aforementioned humectant; reaction products of aforementioned humectant with alkyleneoxides; and mixtures thereof.

7. The aqueous ink jet ink according to claim 1, wherein said colorant is a chemically modified pigment comprising hydrophilic groups or a pigment comprising at least a dispersing agent selected from the group consisting of nonionic, cationic, and anionic dispersing agents.

8. The aqueous ink jet ink according to claim 7, wherein said dispersing agent comprises a hydrophobic functional group and a hydrophilic anionic group and is selected from the group consisting of reaction products of a naphthalenesulfonate salt and an aldehyde; polymers or copolymers of styrenesulfonate salts; copolymers of styrene and acrylic acid salts or methacrylic acid salts; copolymers of styrene and maleic acid salts; and mixtures thereof.

9. The aqueous ink jet ink according to claim 1, wherein said colorant of dye or pigment has a polyaromatic hydrocarbon content less than 5 parts per million.

10. The aqueous ink jet ink according to claim 5, wherein said jetting aids comprise polyethyleneoxide or a small amount of pigment particles of any color with a concentration less than 0.1% by weight.

11. The aqueous ink jet ink according to claim 5, wherein said mono-valent and multi-valent metal salts are selected from the group consisting of salts comprising cations selected from lithium, sodium, potassium, ammonium, calcium, magnesium, cobalt, zinc, barium, nickel, copper, aluminum, iron, lanthanide and actinide metal ions, and anions selected from either an organic acid or an inorganic acid.

12. The aqueous ink jet ink according to claim 5, wherein said surfactants are selected from anionic, cationic, and nonionic materials.

13. A high resolution ink jet printing process comprises:
applying at least an aqueous ink jet ink in an imagewise fashion onto a print substrate by a single or multiple pass method; and
optionally applying heat to said print substrate and imaged inks at any stage of said ink jet printing process including before, during, after, and combinations thereof;
wherein said aqueous ink jet ink comprises water, a colorant of dye or pigment, and a diol derivative represented by the following formula (Formula (I)):

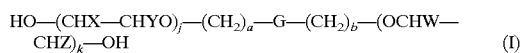

$$HO\text{—}(CHX\text{—}CHYO)_j\text{—}(CH_2)_a\text{—}G\text{—}(CH_2)_b\text{—}(OCHW\text{—}CHZ)_k\text{—}OH \quad (I)$$

wherein G is independently selected from the group consisting of $SO_2$, SO, and CO; X, Y, W, and Z are independently selected from the group consisting of H, $CH_3$, and $C_nH_{2n+1}$ where n equals 2 to about 20; j and k independently equal from 0 to about 100; and a and b independently equal from 1 to about 20.

14. The ink jet printing process according to claim 13, wherein said print substrate is selected from the group consisting of plain papers, coated papers, photo-realistic ink jet papers, and ink jet transparencies.

15. The ink jet printing process according to claim 13, wherein said print substrate is heated by a heating means selected from the group consisting of a radiant heater, a heating tape, a heating plate, a heating drum or roller, a microwave dryer or heating device, a heating lamp, a heating element, and combinations thereof.

16. A multi-color ink jet printing process comprises:
applying a set of at least four different ink jet inks in an imagewise manner at any desired ink printing sequence onto a print substrate using a single or multiple pass method according to digital data signals by their corresponding printheads; and
optionally applying heat to the print substrate and imaged inks at any stage of said ink jet printing process including before, during, after, and combinations thereof;
wherein at least one of said four different ink jet inks comprises water, a colorant of dye or pigment, and a diol derivative according to the following formula (Formula (I)):

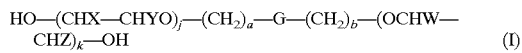

$$HO\text{—}(CHX\text{—}CHYO)_j\text{—}(CH_2)_a\text{—}G\text{—}(CH_2)_b\text{—}(OCHW\text{—}CHZ)_k\text{—}OH \quad (I)$$

wherein G is independently selected from the group consisting of $SO_2$, SO, and CO; X, Y, W, and Z are independently selected from the group consisting of H, $CH_3$, and $C_nH_{2n+1}$ where n equals 2 to about 20; j and k independently equal from 0 to about 100; and a and b independently equal from 1 to about 20.

17. The multi-color ink jet printing process according to claim 16, wherein said diol derivative is a hydroxysulfone derivative comprising at least two hydroxyl group and one sulfone group and may be selected from the group consisting of 4,4'-sulfonyldiphenol, 4,4'-sulfonyl-bis(2,6-dimethylphenol), cis and trans 3,4-dihydroxysulfolanes, cis and trans 3,5-dihydroxy-pentamethylenesulfurdioxides, their isomers, reaction products of said derivative with alkyleneoxides including ethyleneoxide and propyleneoxide, and mixtures thereof.

18. The multi-color ink jet printing process according to claim 16, wherein at least one of said corresponding printheads has a high resolution printing capability of at least $\geq 400$ spots per inch.

19. The multi-color ink jet printing process according to claim 16, wherein said set of at least four different ink jet inks comprise a black ink with a surface tension $\geq 45$ dynes/cm at room temperature; and three different colored inks with a surface tension less than 45 dynes/cm at room temperature.

20. The multi-color ink jet printing process according to the claim 16, wherein each of said corresponding printheads is independently selected from the group consisting of a single printhead, a partial-width printhead, and a full-width array printhead.

21. The multi-color ink jet printing process according to the claim 16, wherein the ink jet printing process is capable of producing multi-color images on a print substrate at a printing speed of greater than or equal to 5 pages per minute.

22. The multi-color ink jet printing process according to the claim 16, wherein said ink jet printing process is selected from a continuous ink jet printing and a drop-on-demand ink jet printing including thermal ink jet, acoustic ink jet, and piezoelectric ink jet printing systems.

23. The multi-color ink jet printing process according to the claim 16, wherein said print substrate is selected from the group consisting of plain papers, coated papers, photo-realistic ink jet papers, textiles, and ink jet transparencies.

24. The multi-color ink jet printing process according to the claim 16, wherein said at least one of said four different ink jet inks has a frequency response of $\geq 8.0$ KHz when it is used in a high resolution printhead of 600 spi.

25. An aqueous ink jet ink comprises water, a colorant of dye or pigment, and a hydroxyl humectant selected from the group consisting of a hydroxylsulfoxide derivative comprising at least two hydroxyl groups and one sulfoxide group and a hydroxyketone derivative comprising at least two hydroxyl groups and one carbonyl group.

* * * * *